Aug. 6, 1957

P. H. McMURRAY ET AL 2,801,612

HOG RESTRAINING DEVICE

Filed May 9, 1955

INVENTORS
P. H. McMURRAY
AND
BY J. M. HAGGARD

Robb+Robb
attorneys

United States Patent Office 2,801,612
Patented Aug. 6, 1957

2,801,612
HOG RESTRAINING DEVICE
Paul H. McMurray and John M. Haggard, Delphi, Ind.

Application May 9, 1955, Serial No. 507,014

2 Claims. (Cl. 119—98)

This invention relates to animal restraining devices which are peculiarly adapted to be initially set to permit an animal to enter the same and to thereafter grip and prevent withdrawal of the animal therefrom.

As will be apparent from the foregoing the attributes ascribed to this invention thus make the same most suitable for use in catching and gripping powerful animals as hogs, the trait relied on to actually assist in the operation, being that of willingness to enter an opening and upon the slightest resistance to passage therethrough, the instantaneous effort to withdraw before the shoulders have actually reached the restraining means.

As is known hogs are often ill-tempered and as a result provision of means which may be pre-set to permit the animal to at least partially enter, strong enough, and so arranged as to automatically adjust to position for gripping whereby positive restraint is effected, is a highly important improvement. This is especially true where the hog is desirably gripped so that veterinarian services may be performed with protection afforded to the operator.

In conjunction with the foregoing another desirable feature of the invention is accentuated when the ability to release a previously trapped or gripped animal is possible.

Still further of importance is the fact that all of the foregoing advantages are accomplished in simple, long-lasting, and relatively inexpensive manner by improved mechanism.

In view of the above the principal objects of the invention are substantially apparent but may be further summarized by stating that a primary purpose hereof is to provide a simply constructed, infinitely adjustable gripping means to carry out the function of automatically catching hogs.

A further phase to be noted is the ability to effect instantaneous release of an animal, without danger to the operator.

Another clear advance in the art is pointed out by the fact that hogs or the like of widely varying weights and sizes may be caught and held as necessary, with safety for animal and operator.

Other important improvements and objects will be brought out in the discussion and description in the specification and shown in the drawings wherein.

Figure 1:
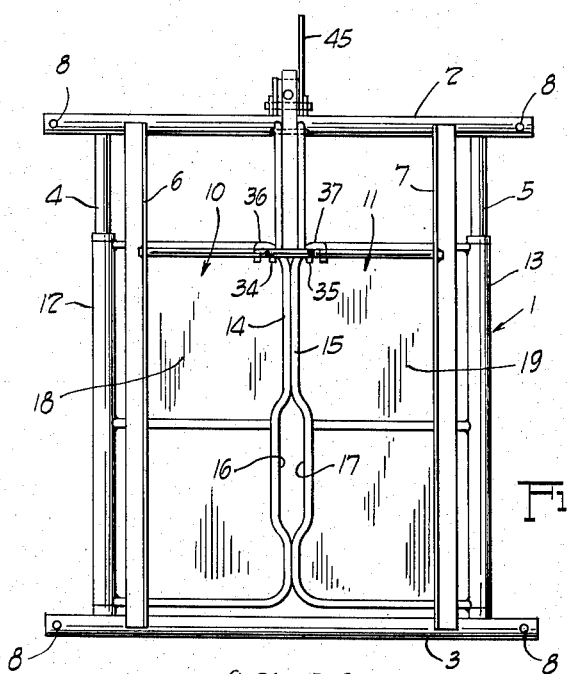
Figure 1 is a view in rear elevation of the device.

Turning now to a description of the device and initially to Figure 1, the invention is seen to generally comprise a substantially rectangular frame 1 formed of top and bottom members 2 and 3, and parallel side members 4 and 5 connected at their ends to members 2 and 3 as by welding. For purposes of strength as well as lightness the members thus far described are preferably tubular in cross section, other of the parts being likewise of that type for that and other reasons which will be understood as this description proceeds.

In addition to the vertical members 4 and 5, other parts 6 and 7, preferably of angle iron are fastened at their extremities to the top and bottom 2 and 3. These angle iron parts further stiffen the entire frame and provide anchorage for the operating mechanism soon to be described.

Reverting for the moment to the members 2 and 3 it will be understood that suitable openings as 8 may be formed in the extremities thereof, whereby the device as a whole may be positioned as a gate in a fence line.

Referring to the vertical members 4 and 5 again, the fact that they are round tubular parts makes them quite suitable for use as pivot points or supports for gates generally denoted 10 and 11.

The gates 10 and 11 are provided with hinge members 12 and 13, also round tubular parts, of sufficient diameter to receive the vertical members 4 and 5 respectively therein as clearly shown in Figure 1.

Each gate includes in addition to the hinge parts 12 and 13 tubular frame members, 14 and 15, preferably one piece in each instance and as shown in Figure 1, so formed as to include the recessed portions 16 and 17 in each.

Each gate 10 and 11 has securely welded thereto, cover plates 18 and 19 respectively, obviously of the same general outline as the tubular frame formed by the parts 14 and 12 for instance, the indented portion of each gate affording a section to grip the neck of a hog or the like, and substantially limit the scope of movement thereby.

Figure 2:
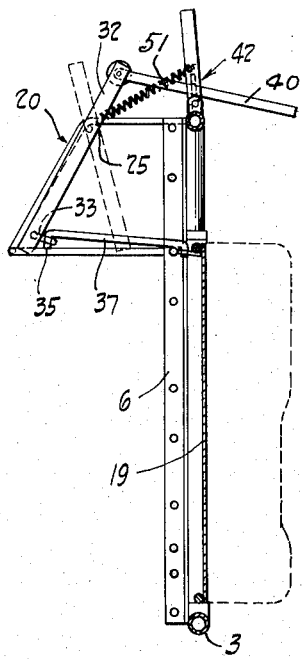
Figure 2 is a side elevation of the same.
Figure 3:
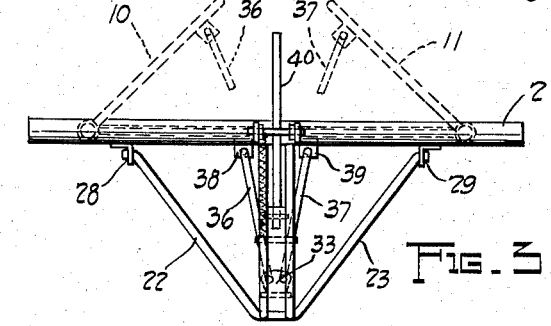
Figure 3 is a top elevation showing the gates partially open in dotted lines.
Figure 4:
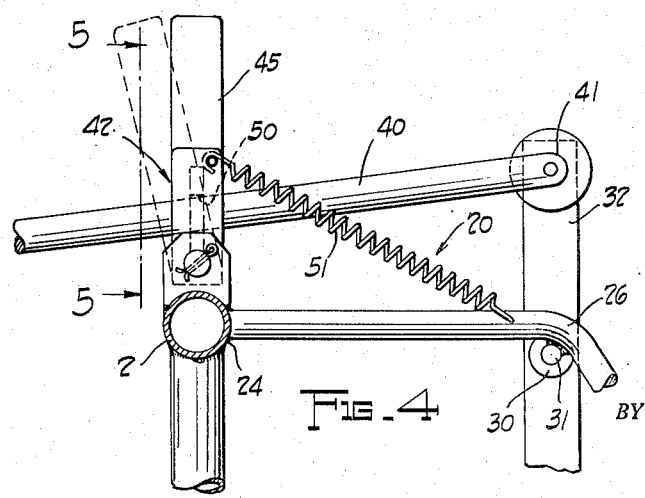
Figure 4 is an enlarged fragmentary view in elevation, showing parts of the positioning means.

Provided to regulate the positions of the respective gates 10 and 11, is a novel positioning means generally denoted 20, which means include a main mounting frame comprising, as seen in Figures 2 and 3, the rod elements 22 and 23. Each of these elements is similarly formed, but of the opposite hand, being welded at 24 for example as seen in Figure 4, extending outwardly and thence downwardly from the points 25 and 26, and thereafter inwardly to places of engagement at 28 and 29 with the vertical angle iron members 6 and 7 respectively, previously described, where they are suitably fastened thereto in any preferred manner.

At the bends 25 and 26, pivot parts as 30 are secured thereto, which parts receive for movement therein a pivot shaft 31. The shaft 31 is secured to an arm 32 which is thus supported for swinging movement.

Extending from the lower end of the arm 32, is a plate 33 provided with holes therein, which receive suitably bent ends 34 and 35 of links 36 and 37, the links in turn connecting at 38 and 39 with ears formed on the gates 10 and 11 respectively.

The foregoing arrangement thus compels the gates to move simultaneously when the arm 32 is moved and it is therefore possible to in turn control that movement by the means now to be described.

Extending from the upper end of the arm 32 is a grip bar 40, preferably of round rod or the like pivoted at 41 and secured to the arm in any preferred manner.

The grip bar 40 extends above the upper transverse frame member 2 and through a gripping unit generally denoted 42, now to be described.

Figure 5:
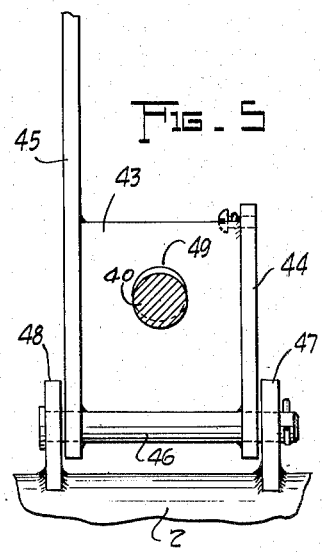
Figure 5 is an enlarged sectional view taken about on the line 5—5 of Figure 4 looking in the direction of the arrows.

This unit 42 consists of a hard steel plate 43, as shown in Figure 5, of generally rectangular shape supported by a hinge member 44 and a control arm 45 to which it is welded, the parts 44 and 45, being in turn carried by a pivot 46. The pivot 46 is mounted in ears 47 and 48 extending upwardly from the member 2.

The grip bar 40 previously described, extends through an opening 49, bored in the plate 43, the opening being of sufficient size to permit a slight swinging movement of the plate when the bar 40 is received therein. Since the plate 43 is of relatively thick material, the opening 49 will thereby be provided with sharp edges such as 50 which will bite into the bar 40 when the plate 43 is suitably positioned.

In order to suitably position the plate 43 for gripping or biting engagement with the bar and maintain the same thereafter, a spring 51 is furnished, connected at one end to the part 44 and at the other to the part 22 as will be seen in Figures 3 and 5.

The foregoing arrangement thus provides what is in effect an infinitely variable gripping positioning of the bar 40, arm 32 connected thereto and correspondingly the gates 10 and 11, to which the arm is in turn connected by the links 36 and 37, the gates being thus compelled to move simultaneously. Further the arrangement of the control unit 42 is such that one way movement only of the bar 40 is permitted. Obviously the gates 10 and 11 are likewise controlled and once set to proper spacing as shown in dotted lines in Figure 3 for example, to grip a large hog therebetween can only be closed.

The hog may be driven toward the gates, assuming that the device is being viewed from above as in Figure 3 and from the bottom to the top. When the animal attempts to pass between the edges of the gates, the positioning unit will prevent them from swinging open further. This resistance at once causes the hog to attempt to withdraw its head but since the edges of the gates are behind its head, further tugging will only cause the edges to be brought slightly closer together, thus positively securing the animal.

Thereafter when the purpose of the restraint has been accomplished, a slight pull on the handle 45 to the dotted line position of Figure 4, will instantly release the gates to thereby open simultaneously, permitting the hog to pass on through.

I claim:

1. In an animal restraining device of the class described, in combination, a frame, a pair of gate means pivotally attached thereto, separate operating elements for effecting simultaneous movement of the gate means and connected thereto, and a positioning means connected to said elements, said positioning means including infinitely adjustable gripping means to maintain said gate means in a plurality of adjusted positions and releasable for the simultaneous movement aforesaid, the said operating elements including an arm connected to the gate means and pivotally supported on the frame, the positioning means comprising a gripping part pivotally mounted on said frame, instrumentalities to bias said part in one direction, said part having an opening therein, and a bar connected at one end to the arm and extending through the opening aforesaid, said bar and opening being so constructed as to provide gripping interengagement.

2. In an animal restraining decive of the class described, in combination, a frame, a gate means pivotally attached to the frame, instrumentalities for controlling movement of the gate means, said instrumentalities including an arm connected thereto for movement therewith, a bar connected to said arm, a gripping part on the frame adapted to grippingly engage said bar, and biasing means connected to the frame and gripping part to maintain said bar in an infinite number of positions, the said gripping part being pivotally mounted on the frame, and formed with an opening to receive the said bar, said opening having portions to bitingly coact with the bar.

References Cited in the file of this patent

UNITED STATES PATENTS 2,099,956 Flatley _____ Nov. 23, 1937
2,671,355 Hawkins _____ Mar. 9, 1954